No. 819,411. PATENTED MAY 1, 1906.
W. E. CRIST.
GATE VALVE.
APPLICATION FILED MAR. 9, 1905.

Witnesses:
Arthur Gunyer.
Fred. Anfricht.

Inventor:
William Edward Crist
by Hans v. Briesen Att'y.

UNITED STATES PATENT OFFICE.

WILLIAM EDWARD CRIST, OF NEW YORK, N. Y., ASSIGNOR TO THE CRIST VALVE MFG. CO., OF CHITTENANGO, NEW YORK, A CORPORATION OF NEW YORK.

GATE-VALVE.

No. 819,411.  Specification of Letters Patent.  Patented May 1, 1906.

Application filed March 9, 1905. Serial No. 249,172.

*To all whom it may concern:*

Be it known that I, WILLIAM EDWARD CRIST, a citizen of the United States, residing at New York city, Brooklyn, county of Kings, and States of New York, have invented new and useful Improvements in Gate-Valves, of which the following is a specification.

This invention relates to a gate-valve composed of two pivotally-connected disks which may yield independently to insure a tight closing of the ports.

The valve is designed for controlling the flow of water and other liquids, but may also be used for controlling the flow of gases.

Figure 1:
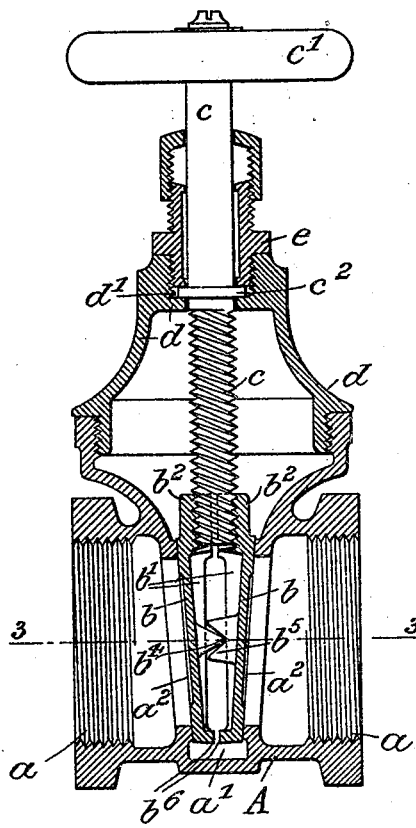
Figure 2:
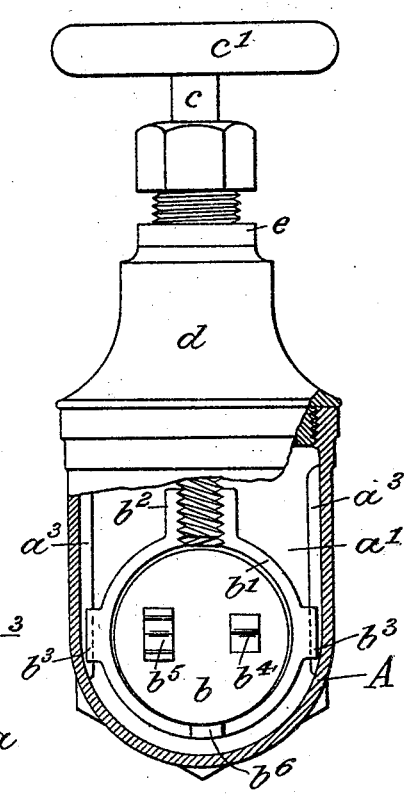
Figure 4:
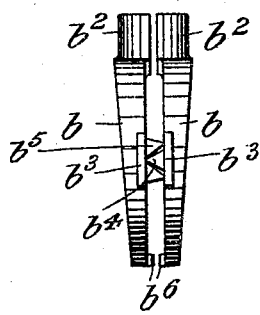
Figure 3:
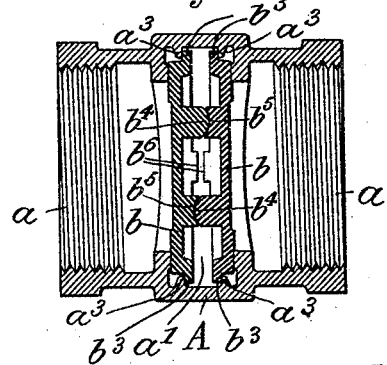

In the accompanying drawings, Figure 1 is a longitudinal section of my improved gate-valve; Fig. 2, an end view, partly in section thereof; Fig. 3, a cross-section on line 3 3, Fig. 1; and Fig. 4, a detail of the valve-disks.

The letter A represents a valve-casing having ingress and egress couplings $a$ and an intervening valve-chamber $a'$. This chamber tapers from top to bottom to form converging valve-seats $a^2$.

The valve is made sectional, being composed of two disk-shaped halves $b$, which are alike in construction. Each disk $b$ has a flat outer surface adapted to engage seat $a$ and a dished inner surface. Integral with the rim $b'$ of the latter is formed a semitubular upwardly-extending contracted neck or nut-section $b^2$. When the parts are assembled, the two nut-sections $b^2$ collectively form a split nut adapted for the reception of the lower threaded end of the valve-spindle $c$. This spindle carries a hand-wheel $c'$ and a collar $c^2$, engaging a recess $d'$, formed between the valve-housing $d$ and a stuffing-box $e$, to prevent an axial displacement of the spindle.

To guide the disks $b$, they are provided with laterally-projecting flanges $b^3$, engaging inwardly-extending parallel ribs $a^3$ of valve-chamber $a'$. Each of the disks $b$ is further provided on one side of its inner face with an integral tongue or knife-edge $b^4$, V-shaped in vertical section, and on its other side with a corresponding V-shaped bearing $b^5$, Fig. 1, the knife-edge of one disk engaging the bearing of the other disk. In this way the disks are fulcrumed to one another and may independently adjust themselves to their seats to form a tight joint. So, also, either disk is free to clear dirt or other obstructions that may pack its seat without influencing the proper working of the other disk.

The knife-edges $b^4$ and V-shaped bearings $b^5$ interlock the disks in such a manner that they will move in unison and that an uneven strain on the nut-sections $b^2$ is avoided. The apex of each knife-edge $b^4$, as well as that of each bearing $b^5$, is rounded in cross-section, Fig. 3, to prevent lateral displacement of the disks.

The tilting movement of the disks $b$ is limited by a pair of inwardly-extending lower stops $b^6$, that project beyond the inner faces of the disks. The length of these stops is such that when the disks are tilted to their maximum extent the threaded spindle $c$ still maintains its engagement with the nut-sections $b^2$.

It will be seen that my improved valve is composed of a small number of parts, is not apt to get out of order, avoids uneven strain, and insures tight closing of the ports.

What I claim is—

In a gate-valve, a pair of threaded valve-disks having each on one side an integral tongue V-shaped in longitudinal section and rounded in cross-section, and on the other side a correspondingly-shaped bearing, the tongue of one disk being alined with the bearing of the other disk, combined with a spindle engaging the disks, substantially as specified.

Signed by me at New York city, (Manhattan,) New York, this 8th day of March, 1905.

WILLIAM EDWARD CRIST.

Witnesses:
WILLIAM SCHULZ,
FRANK V. BRIESEN.